(12) United States Patent
Tabti et al.

(10) Patent No.: US 7,616,523 B1
(45) Date of Patent: Nov. 10, 2009

(54) METHOD FOR COMBINING PRESSURE AND MOTION SEISMIC SIGNALS FROM STREAMERS WHERE SENSORS ARE NOT AT A COMMON DEPTH

(75) Inventors: Hocine Tabti, Osteras (NO); David Helmer Carlson, Houston, TX (US)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 12/291,710

(22) Filed: Nov. 13, 2008

Related U.S. Application Data

(60) Provisional application No. 61/196,997, filed on Oct. 22, 2008.

(51) Int. Cl.
*G01V 1/38* (2006.01)

(52) U.S. Cl. .......................................... 367/24; 367/21

(58) Field of Classification Search .................. 367/21, 367/24
See application file for complete search history.

(56) References Cited

U.S. PATENT DOCUMENTS

| | | | |
|---|---|---|---|
| 5,163,028 A | 11/1992 | Barr et al. | |
| 7,239,577 B2 | 7/2007 | Tenghamn et al. | |
| 7,336,561 B2 * | 2/2008 | Borresen | 367/24 |
| 7,359,283 B2 | 4/2008 | Vaage et al. | |
| 7,386,397 B2 * | 6/2008 | Amundsen et al. | 367/24 |

* cited by examiner

*Primary Examiner*—Ian J Lobo
(74) *Attorney, Agent, or Firm*—E. Eugene Thigpen; Richard A. Fagin

(57) ABSTRACT

A method for using signals measured by pressure responsive seismic sensors and motion responsive seismic sensors disposed in a seismic cable includes simulating a selected range frequency response of the motion responsive sensor signals for each of a plurality of selected depths in a body of water. For each sensor position along the streamer, the one of the simulated selected frequency range responses is selected for which the selected depth most closely matches an actual sensor depth. The selected simulated selected range frequency responses are combined with the measured motion responsive sensor signals to produce full bandwidth motion responsive signals. The full bandwidth signals are combined with the pressure responsive signals to determine at least one of an upgoing and downgoing pressure or motion wavefield.

11 Claims, 5 Drawing Sheets

METHOD FOR COMBINING PRESSURE AND MOTION SEISMIC SIGNALS FROM STREAMERS WHERE SENSORS ARE NOT AT A COMMON DEPTH

CROSS-REFERENCE TO RELATED APPLICATIONS

This application claims priority under 35 U.S.C. 119(e) to U.S. Provisional Application Ser. No. 61/196,997, filed on Oct. 22, 2008, entitled "Method for Combining Signals of Pressure Sensors and Motion Sensors in Marine Seismic Streamers with Irregular Geometry", the disclosure of which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More specifically, the invention relates to methods for processing signals acquired using streamer cables or receiver station lines having both pressure responsive sensors and motion responsive sensors.

2. Background Art

In seismic exploration, geophysical data are obtained by applying acoustic energy to the earth from an acoustic source and detecting seismic energy reflected from interfaces between different layers in subsurface formations. The seismic wavefield is reflected when there is a difference in acoustic impedance between the layer above the interface and the layer below the interface. When using towed streamers in marine seismic exploration, one or more seismic streamers is towed behind an exploration vessel at a water depth typically between about six to about nine meters, but can be towed shallower or deeper. Hydrophones are included in the streamer cable for detecting seismic signals. A hydrophone is a submersible pressure gradient sensor that converts pressure waves into electrical or optical signals that are typically recorded for signal processing, and evaluated to estimate characteristics of the subsurface of the earth.

In a typical geophysical exploration configuration, a plurality of streamer cables is towed behind a vessel. One or more seismic sources are also normally towed behind the vessel. The seismic source, which typically is an airgun array, but may also be a water gun array or other type of source known to those of ordinary skill in the art, transmits seismic energy or waves into the earth and the waves are reflected back by reflectors in the earth and recorded by sensors in the streamers. Paravanes are typically employed to maintain the cables in the desired lateral position while being towed. Alternatively, the seismic cables are maintained at a substantially stationary position in a body of water, either floating at a selected depth or lying on the bottom of the body of water, in which case the source may be towed behind a vessel to generate acoustic energy at varying locations, or the source may also be maintained in a stationary position.

After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure signals. The waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal. Such spectral notches make it difficult to record data with a broad spectrum. Because of the influence of the surface reflection, some frequencies in the recorded signal are amplified and some frequencies are attenuated.

For pressure recording of vertically propagating waves, maximum attenuation will occur at frequencies for which the propagation distance between the detecting hydrophone and the water surface is equal to an integer multiple of one-half wavelength, the first notch being at zero frequency. Maximum amplification will occur at frequencies for which the propagation distance between the detecting hydrophone and the water surface is an odd number integer multiple of one-quarter wavelength. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation will occur at a frequencies zero and about 107 Hz and maximum amplification will occur at frequencies of about 54 and 161 Hz.

It is known in the art to use sensor cables deployed on the water bottom ("ocean bottom cables") which have both pressure responsive sensors such as hydrophones and particle motion sensors, such as geophones, accelerometers or velocity meters. The signals generated by the particle motion responsive sensors are sensitive to the direction from which the motion originates. The pressure responsive sensor signals typically are not directionally sensitive. Such features of particle motion sensors and pressure responsive sensors have been used to attenuate the effects of water layer multiple reflections. See, e.g., U.S. Pat. No. 5,163,208 issued to Barr et al.

More recently, marine seismic streamers have been developed that include both particle motion responsive sensors and pressure responsive sensors. See, e.g., U.S. Pat. No. 7,239,577 issued to Tenghamn et al. and assigned to an affiliate of the assignee of the present invention. Using such streamers is intended to provide techniques for attenuating the effects of the surface ghost. It has been determined through testing and use of streamers such as the one disclosed in the foregoing patent that the signals generated by the particle motion responsive sensors may be subject to towing noise. U.S. Pat. No. 7,359,283 issued to Vaage et al. and assigned to an affiliate of the assignee of the present invention describes methods for using streamers having both pressure responsive sensors such as hydrophones and particle motion responsive sensors to deal with such noise. The techniques include simulating part of a particle motion sensor signal at low frequencies from the pressure responsive sensor signal, using the depth of the marine seismic streamer and the sound wave velocity in water. The simulated low frequency part of the motion sensor signal is combined with the remainder of the motion sensor signal to produce a "full bandwidth" motion sensor signal. The full bandwidth motion sensor signal can be used in conjunction with the pressure signal to determine upgoing and downgoing components of the seismic wavefield.

In performing the method described in the '283 patent, a simplifying assumption is made that all the sensors in the streamers are at essentially the same depth in the water. It is frequently the case that sensors on a streamer are not at the same water depth during operation. It is desirable to have a method to combine pressure responsive seismic signals and motion responsive seismic signals that does not depend on all the sensors being at the same water depth.

SUMMARY OF THE INVENTION

A method according to one aspect of the invention for using signals measured by pressure responsive seismic sensors and motion responsive seismic sensors disposed in a seismic cable includes simulating a selected range frequency response of the motion responsive sensor signals for each of a plurality of selected depths in a body of water. For each sensor position along the streamer, the one of the simulated selected frequency range responses is selected for which the selected depth most closely matches an actual sensor depth. The selected simulated selected range frequency responses are combined with the measured motion responsive sensor signals to produce full bandwidth motion responsive signals. The full bandwidth signals are combined with the pressure responsive signals to determine at least one of an upgoing and downgoing component of a pressure or motion wavefield.

In one example, the method includes extrapolating at least one of the upgoing and downgoing component wavefields to a selected output depth for each of the plurality of the same selected depths in the body of water.

A method for seismic surveying according to another aspect of the invention includes towing at least one streamer having a plurality of spaced apart pressure responsive sensors and motion responsive sensors in a body of water. At selected times a seismic energy source is actuated in the water. Signals from each of the sensors are detected in response to the actuations of the source. Selected frequency range response of the motion responsive sensor signals are simulated for each of a plurality of selected depths in the body of water. For each sensor position along the at least one streamer, the one of the simulated low frequency responses is selected for which the selected depth most closely matches an actual sensor depth. The selected simulated selected frequency range responses are combined with the detected motion responsive signals to provide full bandwidth motion responsive sensor signals. The full bandwidth motion responsive signals and the detected pressure responsive seismic signals are used to determine at least one of an upgoing and downgoing component of a pressure or motion wavefield.

Other aspects and advantages of the invention will be apparent from the following description and the appended claims.

DETAILED DESCRIPTION

Figure 1:
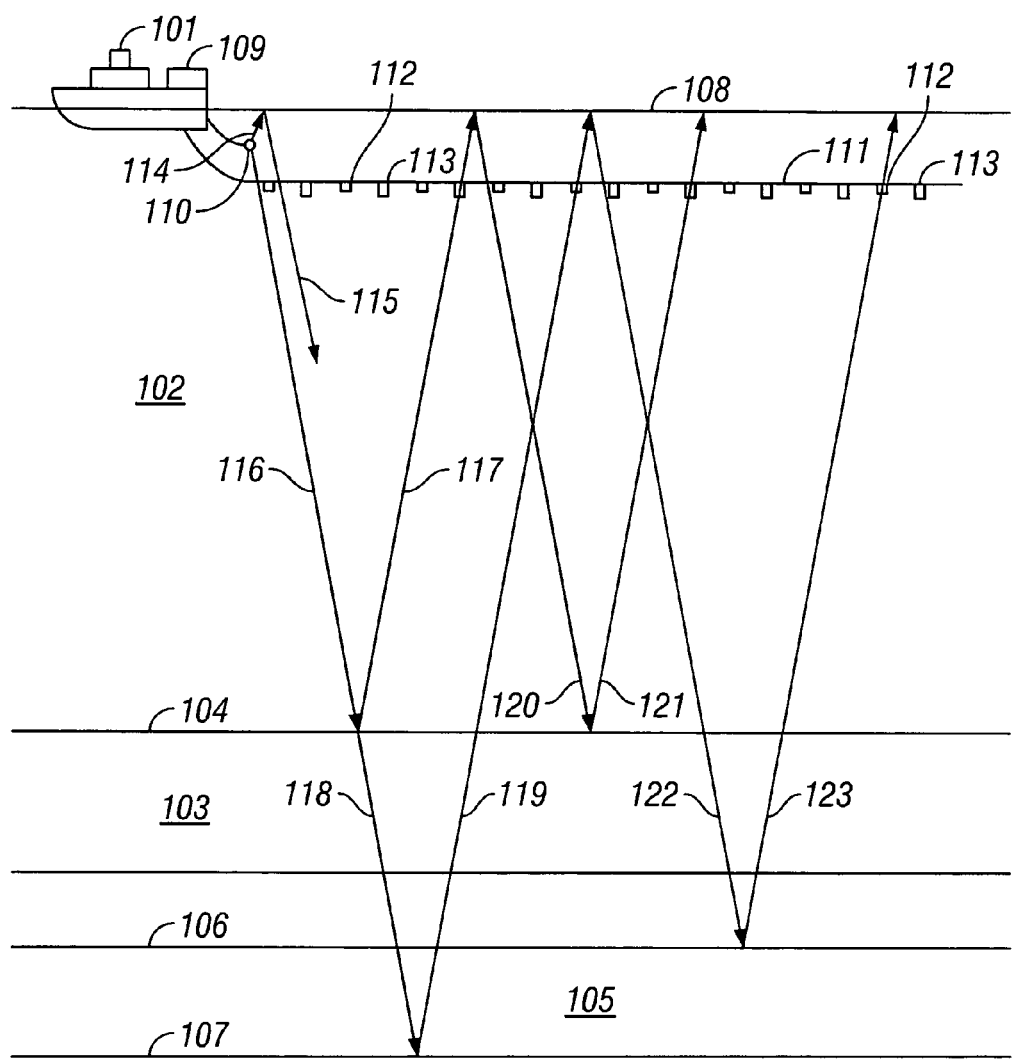
FIG. 1 is an illustration of a method for acquiring marine seismic data that can be used with the method of the invention.

FIG. 1 shows a signal acquisition arrangement (not drawn to scale) for acquiring marine seismic signals that can be used with a method according to the invention. A seismic vessel 101 moves along the surface 108 of a body of water 102 above the earth's subsurface 103. Beneath the water bottom 104, the earth 103 contains formations of interest such as layer 105 positioned between an upper boundary 106 and a lower boundary 107. The seismic vessel 101 includes seismic acquisition control equipment, designated generally at 109. The seismic acquisition control equipment 109 includes (none shown separately) navigation control, seismic source control, seismic sensor control, and recording equipment, all of types well known in the art of seismic data acquisition.

The seismic acquisition control equipment 109 causes a seismic source 110 towed in the body of water 102 by the seismic vessel 101 (or by another vessel) to actuate at selected times. The seismic source 110 may be of any type well known in the art of seismic acquisition, including air guns or water guns, or particularly, arrays of air guns. Seismic streamers 111 are also towed in the body of water 102 by the seismic vessel 101 to record the acoustic wavefields initiated by the seismic source 110 and reflected from interfaces in the environment. Although only one seismic streamer 111 is shown in FIG. 1 for illustrative purposes, typically a plurality of seismic streamers 111 are towed behind the seismic vessel 101 at laterally spaced apart positions from the centerline of the vessel 101.

The seismic streamers 111 contain longitudinally spaced apart sensors to detect the reflected wavefields initiated by the seismic source 110. The seismic streamers 111 include pressure responsive sensors such as hydrophones 112 and particle motion responsive sensors such as geophones 113. The hydrophones 112 and geophones 113 are typically co-located in pairs or pairs of sensor arrays at selected intervals along the seismic streamers 111. However, the type of sensors 112, 113 and their locations along the seismic streamers 111 are not intended to be a limitation on scope of the present invention. It should also be noted that in the description that follows, the term "hydrophone" is intended to mean any pressure responsive sensor or the signals generated by such sensor, and the term "geophone" is intended to mean any particle motion responsive sensor or the signals generated by such sensor. Non-limiting examples of motion responsive sensors include geophones, accelerometers and velocity meters. Accordingly, reference to the terms hydrophone and geophone are not intended to limit the scope of the present invention to using hydrophones and geophones or their respective signals.

Each time the seismic source 110 is actuated, an acoustic wavefield travels outwardly in spherically expanding wave fronts. The propagation of the wave fronts will be illustrated herein by ray paths which are perpendicular to the wave fronts. Upwardly traveling wavefield, designated by ray path 114, will reflect from the water-air interface at the water surface 108 and then travel downwardly, as in ray path 115, where the wavefield may be detected by the hydrophones 112 and geophones 113 in the seismic streamers 111. Such a reflection at the water surface 108, as in ray path 115 contains no useful information about the subsurface formations of interest. However, such surface reflections, also known as "source ghost", act in the manner of secondary seismic sources with a time delay.

Downwardly traveling wavefield, in ray path 116, will reflect from the earth-water interface at the water bottom 104 and then travel upwardly, as in ray path 117, where the wavefield may be detected by the hydrophones 112 and geophones 113. Such a reflection at the water bottom 104, as in ray path 117, contains information about the water bottom 104. Ray path 117 is an example of a primary reflection, having one reflection in the subsurface. The downwardly traveling wavefield, as in ray path 116, may transmit through the water bottom 104 as in ray path 118, reflect from a layer boundary, such as 107, of a layer, such as 105, and then travel upwardly, as in ray path 119. The upwardly traveling wavefield, as in ray path 119, may then be detected by the hydrophones 112 and geophones 113. Such a reflection from a layer boundary 107 contains useful information about a formation of interest 105 and is also an example of a primary reflection, having one reflection in the subsurface formations below the water bottom.

However, the acoustic wavefields continue to reflect from interfaces such as the water bottom 104, water surface 108, and layer boundaries 106, 107 in combinations. For example, the upwardly traveling wavefield in ray path 117 will reflect from the water surface 108, continue traveling downwardly in ray path 120, may reflect from the water bottom 104, and continue traveling upwardly again in ray path 121, where the wavefield may be detected by the hydrophones 112 and geophones 113. Ray path 121 is an example of a multiple reflection, also called simply a "multiple", having multiple reflections from interfaces. Similarly, the upwardly traveling wavefield in ray path 119 will reflect from the water surface 108, continue traveling downwardly in ray path 122, may reflect off a layer boundary 106 and continue traveling upwardly again in ray path 123, where the wavefield may be detected by the hydrophones 112 and geophones 113. Ray path 123 is another example of a multiple reflection, also having multiple reflections in the subsurface. Multiple reflections contain redundant information about the formations of interest and commonly are removed from seismic data before further processing. Ray path 120, in particular, represents the energy that results in the "receiver ghost", and it is this ghost signal in particular that is addressed by the present invention.

The example configuration shown in FIG. 1 using towed streamers is only one possible configuration of seismic acquisition devices that may be used in accordance with the present invention. In other example configurations, pressure responsive and motion responsive seismic sensors may be disposed in a cable deployed on the water bottom ("ocean bottom cables"). Such cables are described, for example, in U.S. Pat. No. 5,163,208 issued to Barr et al. For purposes of defining the present invention, a towed streamer such as shown in FIG. 1 and an ocean bottom cable, as well as similar devices having spaced apart pressure responsive and motion responsive seismic sensors will be referred to herein as a "seismic cable."

As explained in the Vaage et al. '283 patent cited hereinabove, a limitation to using geophone signals in towed streamers is the presence of substantial towing noise in a selected frequency range. In the method disclosed in the '283 patent as well as in the present invention, the portion of the geophone signal in such frequency range may be simulated using the hydrophone signal. A combined geophone signal having reduced effects of towing noise may then be generated using the simulated selected frequency portion and measured geophone signals at frequencies other than the selected frequency range. Part of the method dealing with geophone signal simulation within a selected frequency range will be described with reference to the flowchart in FIG. 2.

At 210, the hydrophone and geophone signals as measured (and recorded) may be transformed from the space-time (x, t) domain to the frequency-wavenumber (f, k) domain. At 220 in FIG. 2, the domain transformed hydrophone and geophone signals, $H_{(f,k)}$ and $G_{(f,k)}$, respectively, from the domain transform at 210 can be corrected for relative differences between the sensor transfer functions, which correspond to sensor impulse responses in the time domain. Such corrections could include, for example, correcting the amplitude and phase of the hydrophone signals to match the geophone signals, correcting the geophone signals to match the hydrophone signals, or correcting both sets of signals to a common basis. Correcting for relative differences in sensor impulse responses is well known in the art. Finally, an amplitude scaling equal to the inverse of the acoustic impedance in the water may be applied to the geophone signals to correct for the relative differences in amplitudes of pressure and particle velocity. Such scaling is also well known in the art.

Figure 2:
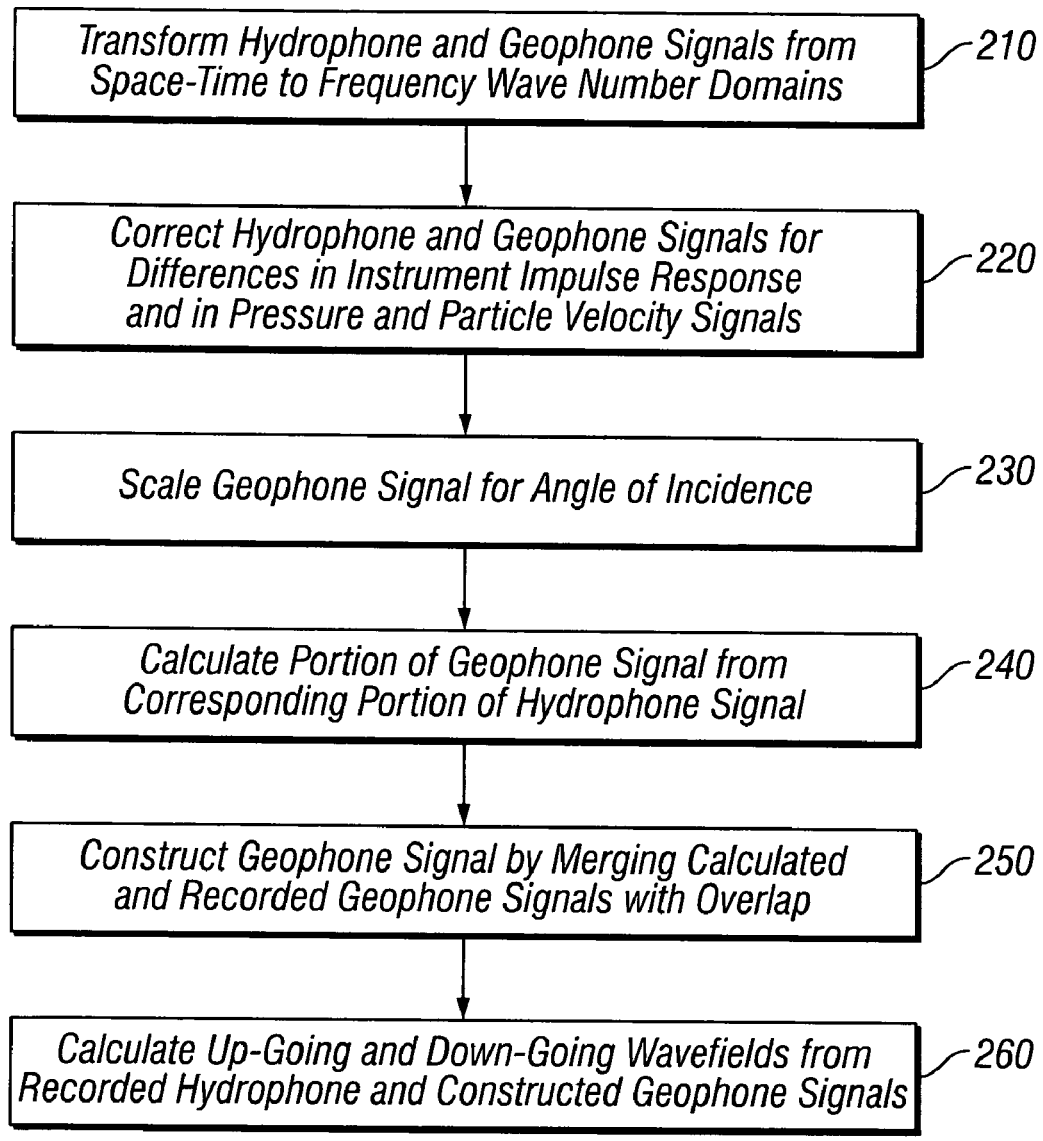
FIG. 2 is a flowchart illustrating the processing steps for combining signals of pressure sensors, e.g., hydrophones and particle motion sensors, e.g., geophones, disposed in a marine seismic streamer.

At 230 in FIG. 2, the corrected geophone signals from 220 may be further corrected for angle of incidence. While a hydrophone records the total pressure wavefield, a vertically oriented geophone will only record the vertical component of the particle motion wavefield. The vertical component will be equal to the total particle motion wavefield only for signals which are propagating vertically, i.e., for which the angle of incidence equals zero. For any other angle of incidence the geophone signals need to be scaled, for example, substantially as described in the Vaage et al. '283 patent.

At 240 in FIG. 2, a part of the geophone signal within the selected frequency range can be calculated or estimated from the recorded hydrophone signal. The foregoing may also be performed substantially as explained in the Vaage et al. '283 patent.

At 250 in FIG. 2, a full bandwidth geophone signal can be calculated or estimated by merging the calculated selected frequency portion thereof with the measured geophone signals in the part of the frequency spectrum other than the selected frequency range, including some overlap. The foregoing may also be performed substantially as explained in the Vaage et al. '283 patent.

At 260 in FIG. 2, a full bandwidth geophone data set and the recorded hydrophone signals can be added or subtracted to calculate a full bandwidth upgoing and downgoing wavefield. The foregoing can be performed substantially as explained in the Vaage et al. '283 patent.

Figure 3:
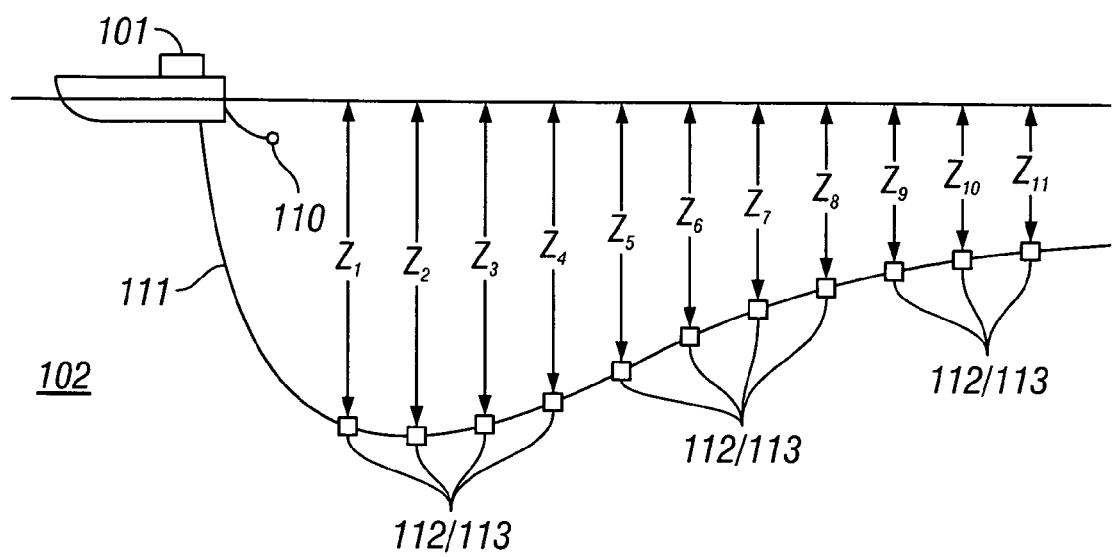
FIG. 3 shows an example of a seismic streamer with sensors not all at the same depth.

As explained in the Background section herein, the foregoing procedure explained with reference to FIGS. 1 and 2 for acquiring and combining hydrophone and geophone signals uses the assumption that all the sensors are at the same depth in the water. As was also explained in the Background section herein, such is frequently not the case during acquisition of seismic signals. Referring to FIG. 3, a situation is shown in which all the sensors on the streamer are not at a common depth. In FIG. 3, the sensors are shown as collocated hydrophones and geophones 112/113 for simplicity of the illustration, and as may be inferred by reference to the Vaage et al. '283 patent, one useful configuration of "dual sensor" seismic streamer in fact uses such collocated pressure and motion responsive sensors. Each collocated hydrophone/geophone 112/113 is at a depth represented by each of Z1 through Z11, respectively. Because each collocated sensor 112/113 is at a different depth, implementing the method of the Vaage et al '283 patent using a common depth assumption may introduce errors, in particular with respect to the calculation of the selected frequency portion of the geophone signal from the hydrophone signal.

Figure 4:
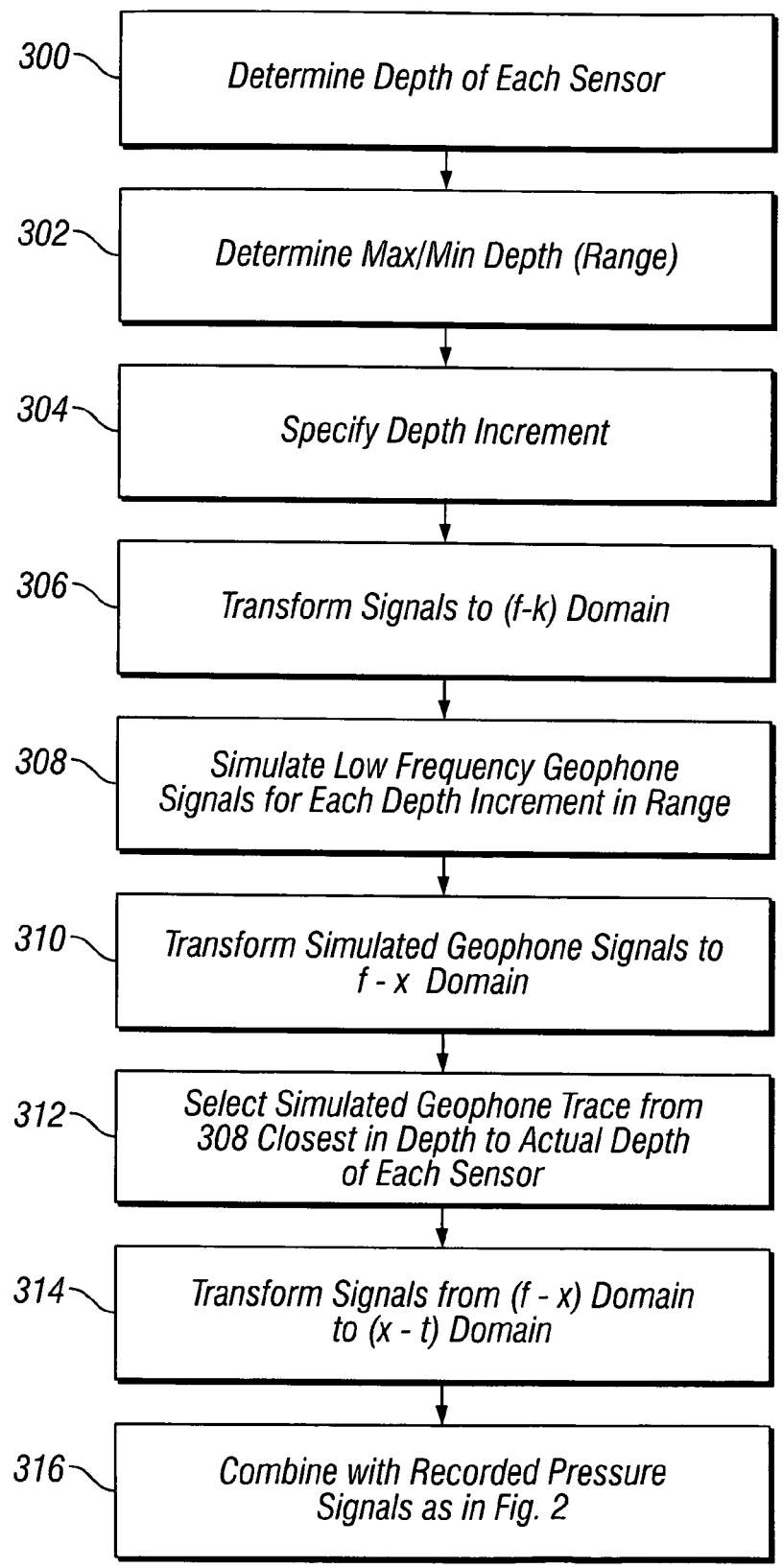
FIG. 4 is a flow chart of an example method in which all sensors are not at a common water depth.

Referring to the flow chart in FIG. 4, an example of a method according to the invention includes, at 300, estimating or determining a depth of each sensor on the seismic streamer (e.g., Z1 through Z11 in FIG. 3). The depth of each sensor may be determined, for example, by measuring hydrostatic pressure at each sensor (112/113 in FIG. 3). If suitable hydrophones are used, the zero frequency (DC) component of the hydrophone signal may be used for depth determination. If pressure time gradient hydrophones are used, for example, it may be desirable to include a separate static pressure sensor proximate each collocated hydrophone/geophone. The foregoing is not intended to limit the devices or techniques which may be used to determine or estimate sensor depth.

When the depths of the sensors are estimated or determined, a range of depths may then be defined, at 302, for example, a range including the shallowest sensor depth and the greatest sensor depth. A processing depth increment may then be defined, at 304. The value of processing depth increment may be, for example, a selected fraction of the depth range, such as 0.01 to 0.05 of the depth range, or the increment may be a selected depth amount. (At 306, the signals recorded by each of the sensors may be transformed from the space time (x, t) domain into the frequency wavenumber (f, k) domain. After domain transformation, a selected frequency range portion of each geophone signal may be calculated, at 308, for each depth increment in the range. Thus, for each actuation of the seismic energy source, a plurality of simulated geophone signals in the selected frequency range will be generated corresponding to each depth increment in the depth range. As explained in the Vaage et al. '283 patent, the selected frequency portion of the geophone signals may be calculated using the following expression:

$$G_{calc}(f, k) = H_{meas}(f, k) \frac{1 - c\exp(-2\pi i f \tau)}{1 + c\exp(-2\pi i f \tau)} \quad (1)$$

in which $G_{calc}$ represents the simulated geophone signal portion in the f, k domain, $H_{meas}$ represents the measured or detected hydrophone signal in the f, k domain, c represents the reflection coefficient at the air-water interface (the water surface), and $\tau$ represents the time delay between a directly arriving seismic signal and a ghost reflection from the water surface. The time delay will be related to the water depth D and the seismic velocity in the water v as follows:

$$\tau = \frac{2D\sqrt{1 - \frac{v^2|k|^2}{f^2}}}{v} \quad (2)$$

Thus simulated geophone signal portions in the selected frequency range $G_{calc}$ can be calculated for each depth increment within the range. At 310, the foregoing simulated selected frequency portions of the geophone signal may be transformed from the f, k domain to the f, x (frequency-offset) domain. Offset is generally defined as a distance along the water surface between the seismic energy source and the respective seismic sensor. The result will be f, x domain selected frequency range geophone signal portions for each geophone position and for each depth increment in the depth range.

At 312, for each sensor position on the streamer, the one of the f, x transformed, simulated geophone signal portions is selected for which the simulation depth most closely matches the actual depth (determined at 300) of each sensor at the time the signals were acquired. At 314, the set of selected geophone simulations may be transformed from the f, x domain to the x, t domain. The result of the foregoing will be a set of simulated selected frequency geophone portions for which the simulation is performed at approximately the actual depth of each sensor. At 316, the simulated geophone signal portions may be combined with the measured geophone signals as explained above with reference to FIG. 2 and/or as explained in the Vaage et al. '283 patent to provide the equivalent of a full bandwidth geophone signal for each geophone in the streamer.

The full bandwidth geophone signals may be used as explained above to determine upgoing and downgoing components of the seismic wavefield ("wavefield separation"). After wavefield separation into upgoing and downgoing components (e.g., at 260 in FIG. 2), a similar technique as explained with reference to FIG. 4 can be used to extrapolate the separated upgoing and downgoing wavefields to simulate seismic signals that would be recorded in which all the sensors are at a common depth. The upgoing and downgoing wavefield components (U and D respectively) for a common sensor depth $z_R$ can be extrapolated to a selected common output depth $z_O$ in the f, k domain using the following expressions:

$$U(f, \bar{k}|z = z_O) = U(f, \bar{k}|z = z_R)\exp(i2\pi f \tau_e) \quad (3)$$
$$D(f, \bar{k}|z = z_O) = D(f, \bar{k}|z = z_R)\exp(-i2\pi f \tau_e)$$

$$\tau_e = \frac{(z_O - z_R)\sqrt{1 - \frac{v^2 \cdot |k|^2}{f^2}}}{v}$$

Figure 5:
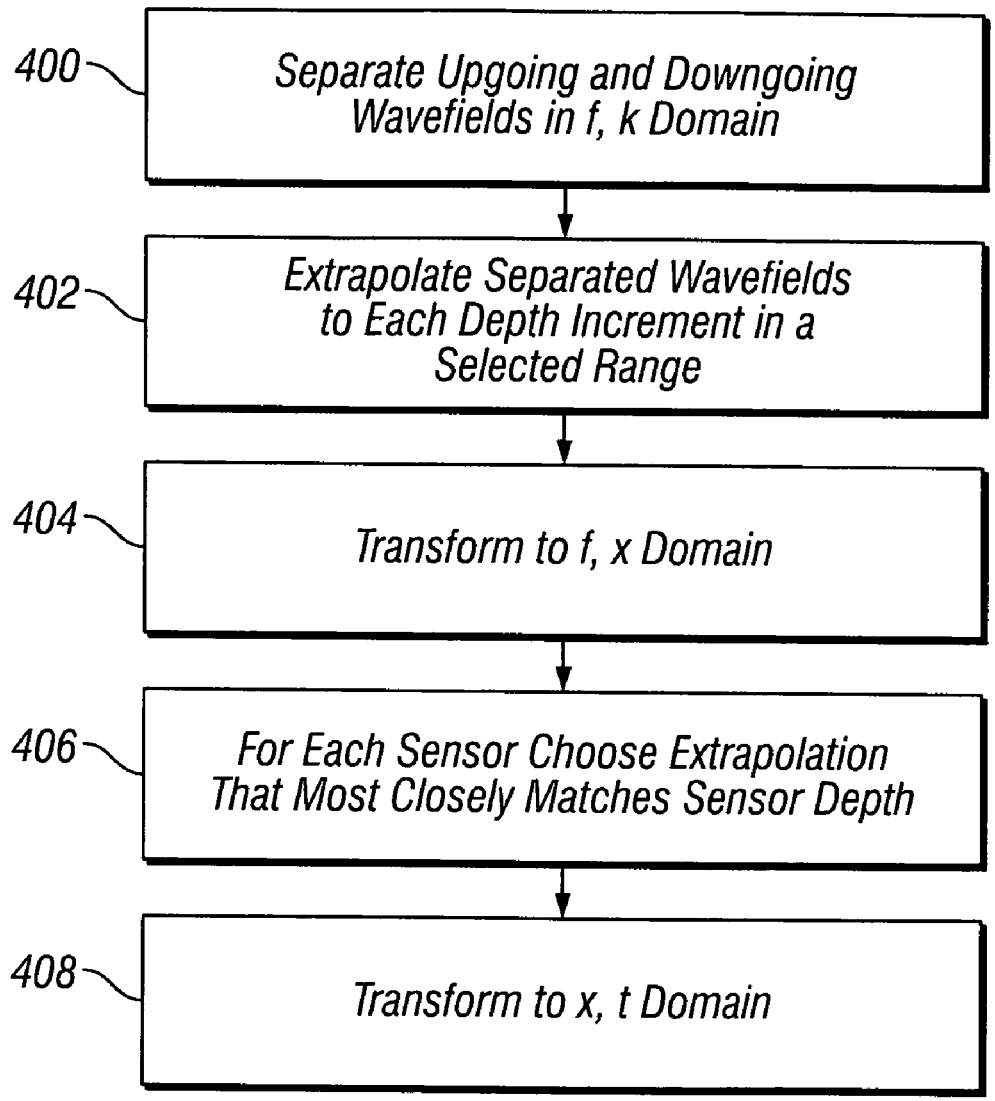
FIG. 5 is a flow chart of a method for extrapolating separated upgoing and downgoing wavefields to a selected depth in the water.

Referring to the flow chart in FIG. 5, $z_R$ may be set the within range of depths between the minimum and maximum in steps of the increment explained above with reference to FIG. 4. The separated wavefields in the f, k domain, at 400, may be extrapolated, at 402, to each depth increment $z_R$ in the range, e.g., according to the formulas above in equation (3). At 404, each extrapolated wavefield at each depth increment may be transformed to the f, x domain. At 406, for each sensor position (x) along the streamer, the one of the foregoing wavefield extrapolations is selected at the depth $z_R$ that most closely matches the actual sensor depth. The selected wavefield extrapolations can then be transformed, at 408, to the x, t domain.

Alternatively, for data recorded at a common sensor depth $z_R$, the extrapolation could be performed for a range of output depth values. Such a procedure might be applicable for comparison between data acquired using a dual-sensor streamer and data acquired using ocean bottom sensor cables placed on the water bottom, which typically has an irregular surface. In its most general form, the method can be used to extrapolate up- and down-going wavefields from an irregular recording surface to another irregular surface.

Methods for processing "dual sensor" seismic signals according to the invention may provide more accurate results than methods that do not account for variable seismic sensor depth.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for using signals measured by pressure responsive seismic sensors and motion responsive seismic sensors disposed at spaced apart positions along a seismic cable, the method comprising:

simulating a selected frequency range response of the motion responsive sensor signals for each of a plurality of selected depths in a body of water;

choosing, for each sensor position along the streamer, the one of the simulated selected frequency range responses for which the selected depth most closely matches an actual sensor depth;

combining the chosen simulated selected frequency range responses with the measured motion responsive signals to provide full bandwidth motion responsive sensor signals; and using the full bandwidth motion responsive signals and the pressure responsive seismic signals to determine at least one of an upgoing and downgoing component of a pressure or motion wavefield.

2. The method of claim 1 further comprising separating upgoing and downgoing components of the measured pressure and motion responsive signals using the combined simulated low frequency responses and the measured motion responsive and pressure responsive seismic signals.

3. The method of claim 1 wherein the selected depths are within a range defined by a greatest and a smallest depth of the sensors on the streamer when disposed in a body of water.

4. The method of claim 1 wherein the range is divided into selected increments.

5. The method of claim 1 wherein the cable is towed in a body of water.

6. The method of claim 1 further comprising:

extrapolating separated upgoing and downgoing wavefields to each of a plurality of selected depths in the body of water;

for each of the sensor positions along the streamer, selecting the one of the extrapolated wavefields at a depth that most closely matches the actual sensor depth.

7. A method for seismic surveying, comprising:

towing at least one streamer having a plurality of spaced apart pressure responsive sensors and motion responsive sensors in a body of water;

at selected times actuating a seismic energy source in the water;

detecting signals from each of the sensors in response to the acutations of the source;

simulating a selected frequency range response of the motion responsive sensor signals for each of a plurality of selected depths in the body of water;

choosing, for each sensor position along the at least one streamer, the one of the simulated selected frequency range responses for which the selected depth most closely matches an actual sensor depth;

combining the chosen simulated selected frequency range responses with the detected motion responsive signals to provide full bandwidth motion responsive sensor signals; and using the full bandwidth motion responsive signals and the detected pressure responsive seismic signals to determine at least one of an upgoing and downgoing component of a pressure or motion wavefield.

8. The method of claim 7 further comprising separating upgoing and downgoing components of the measured pressure and motion responsive signals using the combined simulated low frequency responses and the measured motion responsive and pressure responsive seismic signals.

9. The method of claim 7 wherein the selected depths are within a range defined by a greatest and a smallest depth of the sensors on the streamer when disposed in a body of water.

10. The method of claim 7 wherein the range is divided into selected increments.

11. The method of claim 7 further comprising:

extrapolating separated upgoing and downgoing wavefields to each of a plurality of selected depths in the body of water;

for each of the sensor positions along the streamer, selecting the one of the extrapolated wavefields at a depth that most closely matches the actual sensor depth.

* * * * *